(12) United States Patent
Syed

(10) Patent No.: US 11,504,215 B2
(45) Date of Patent: Nov. 22, 2022

(54) DISPOSABLE FLOSSER HEAD ATTACHMENT FOR A WATER FLOSS PICK

(71) Applicant: Seemie N. Syed, Dania Beach, FL (US)

(72) Inventor: Seemie N. Syed, Dania Beach, FL (US)

( * ) Notice: Subject to any disclaimer, the term of this patent is extended or adjusted under 35 U.S.C. 154(b) by 564 days.

(21) Appl. No.: 16/446,586

(22) Filed: Jun. 19, 2019

(65) Prior Publication Data

US 2020/0397545 A1 Dec. 24, 2020

(51) Int. Cl.
*A61C 15/04* (2006.01)
*A61C 17/032* (2006.01)
*A61C 17/02* (2006.01)

(52) U.S. Cl.
CPC ........ *A61C 15/048* (2013.01); *A61C 17/0202* (2013.01); *A61C 17/032* (2019.05)

(58) Field of Classification Search
CPC ... A61C 15/048; A61C 15/047; A61C 15/046; A61C 15/04; A61C 15/00; A61C 17/0202; A61C 17/02; A61C 17/227; A61C 17/228; A61C 17/36
USPC ........ 601/162, 163, 164, 165; 132/322, 323, 132/200
See application file for complete search history.

(56) References Cited

U.S. PATENT DOCUMENTS

| | | | | |
|---|---|---|---|---|
| 3,939,853 A * | 2/1976 | Spanondis | ........... | A61C 15/046 132/309 |
| 4,031,908 A * | 6/1977 | Ting | ..................... | A46B 11/063 132/322 |
| 4,883,080 A * | 11/1989 | Lang | .................. | A61C 17/0202 132/322 |
| 5,094,256 A * | 3/1992 | Barth | ..................... | A61C 15/00 132/327 |
| 5,183,064 A * | 2/1993 | Barth | ................... | A61C 15/048 132/321 |
| 5,286,065 A * | 2/1994 | Austin | ............... | A61C 17/0202 285/23 |
| 5,570,709 A * | 11/1996 | Haddad | ................ | A61C 15/046 433/88 |
| 5,669,097 A * | 9/1997 | Klinkhammer | .......... | A46B 7/04 15/167.1 |
| 5,906,213 A * | 5/1999 | Diffendal | ................. | A46B 7/04 132/309 |
| 6,076,535 A * | 6/2000 | Yipp | ..................... | A61C 15/046 225/80 |
| 7,621,687 B1 * | 11/2009 | Rehkemper | ............ | A61C 17/36 401/270 |
| 2011/0027749 A1 * | 2/2011 | Syed | ........................ | A61L 2/16 433/82 |

(Continued)

*Primary Examiner* — Cris L. Rodriguez
*Assistant Examiner* — Sydney J Pulvidente
(74) *Attorney, Agent, or Firm* — Rahman LLC

(57) ABSTRACT

An apparatus for performing dental hygiene includes a concave support member integrally coupled to an upper end of a handle portion, and a floss attachment coupled to the concave support member between a first end and a second end of the concave support member. A hollow passage extending from a lower end of the handle portion to the second end of the concave support member is provided, which receives a water flosser tip such that water from the water flosser tip traverses and exits from an aperture shaped end of the hollow passage at the second end of the concave support member onto the floss attachment in a direction substantially parallel to the floss attachment for the apparatus to work as a water floss pick.

10 Claims, 7 Drawing Sheets

(56) References Cited

U.S. PATENT DOCUMENTS

2015/0282909 A1* 10/2015 Roberts .............. A61C 17/0202
433/88

* cited by examiner

DISPOSABLE FLOSSER HEAD ATTACHMENT FOR A WATER FLOSS PICK

BACKGROUND

Technical Field

The embodiments herein generally relate to dental devices, and more particularly to a disposable flosser head attachment that fits into a water flosser tip allowing the conversion of a water flosser tip into a water floss pick.

Description of the Related Art

Tooth decay has been implicated in the cause and progression of many systemic and organ related diseases. Dental professionals recommend removal of dental plaque from the surface of teeth on at least a daily basis. Plaque is a clear sticky substance, which continually forms in the mouth above and below the "gumlines". Plaque can calcify and form a hardened material, tartar; however, cleaning around each tooth prevents calcification of plaque. This cleaning aids in the prevention of cavities and related dental problems. It is well recognized that brushing with a toothbrush is not sufficient to avoid these problems.

Various types of flossing devices are available to remove plaque and clean around the teeth to overcome the stated shortcomings of the brushing with a toothbrush. In order to continuously remove debris generated during flossing, flossers with water flow have been in use. However, during the process of flossing by a user, bacteria from mouth of the user, or from other sources, may get deposited on head of the flossing device, and grow. Thus, a flosser used repeatedly may simply spread bacteria. Therefore, some conventional flossing devices include a disposable flosser, such as the ones disclosed by U.S. Pat. Nos. 9,375,299 and 9,770,315, the complete disclosures of which, in their entireties, are herein incorporated by reference. The disposable flossers of the above-referenced documents are typically used only with a handle portion that comprises a water pressure motor of the flossing device.

SUMMARY

In view of the foregoing, an embodiment herein provides an apparatus for performing dental hygiene, comprising: a handle portion having an upper end and a lower end; a concave support member integrally coupled to the handle portion at the upper end of the handle portion, and having a first end and a second end; and a floss attachment comprising a first end connected to the first end of the concave support member, and a second end connected to the second end of the concave support member.

The apparatus further comprises a hollow passage extending from the lower end of the handle portion to the second end of the concave support member. The hollow passage has a first end located at the lower end of the handle portion and a second end located at the second end of the concave support. The first end of the hollow passage is configured to receive a water flosser tip (also known in the art as a water flosser nozzle) such that water from the water flosser tip traverses towards the second end of the hollow passage.

The second end of the hollow passage defines an aperture positioned to direct water traversing the hollow passage onto the floss attachment in a direction from the second end of the floss attachment towards the first end of the floss attachment substantially parallel to the floss attachment.

The aperture may be concentric to the floss attachment so that the water flowing out of the aperture traverses in direction along the floss attachment.

The apparatus may comprise a first contact component to support the floss attachment at the first end of the floss attachment, and a second contact component to support the floss attachment at the second end of the floss attachment.

The apparatus may further comprise at least one sealing mechanism located on an inner surface of the hollow passage such that the sealing mechanism engage with the water flosser tip received in the hollow passage, and thereby prevent flow of water from the water flosser tip towards the first end of the hollow passage.

The at least one sealing mechanism may be an O-ring located in a groove provided on the inner surface of the hollow passage such that when the water flosser tip is received in the hollow passage, an inner surface of the O-ring engages with the water flosser tip.

The apparatus may further comprise a lock mechanism located adjacent to the lower end of the handle portion. The lock mechanism can be configured to selectively retain and release the water flosser tip received in the hollow passage.

The lock mechanism may include a push button located on an outer surface of the handle portion to unlock the water flosser tip so that the water flosser tip may be removed from the hollow passage.

The handle portion and the concave support member can be made of a polymeric material, such as a silicone based polymeric material.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1A:
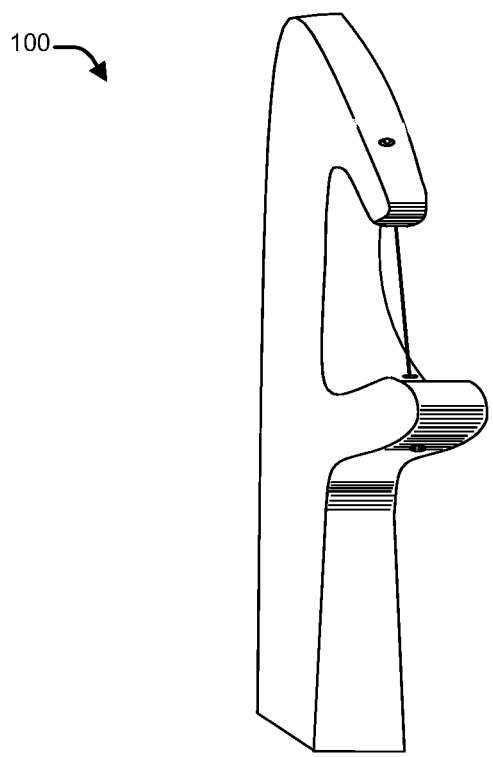
FIG. 1A is a front isometric view of a disposable flosser head attachment for a water floss pick, according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an apparatus for performing dental hygiene, which fits onto existing water flosser tips and converts the water flosser tip into a water floss pick. The attachment comprises a floss, and permits water from the water flosser tip to work together with the floss for flossing action.

The apparatus is a disposable flosser head attachment and can be changed to prevent its usage over an extended period of time. Thus, it solves the problem of ensuring hygiene due to accumulation and growth of bacteria from mouth of the user, or from other sources, on the head of the flossing device.

The disposable flosser head attachment can be used by a user either alone, without being coupled with a water flosser tip, or with water after coupling with a water flosser tip, which converts it to a water floss pick.

Referring to FIG. 1A to FIG. 1C and FIG. 2A to FIG. 2E, where different views of a disposable flosser head attachment apparatus 100 for a water floss pick are shown. The apparatus 100 for performing oral hygiene (also referred to as disposable flosser head attachment apparatus for a water floss pick) may be substantially claw-shaped and include a handle portion 102 having an upper end 106 and a lower end 108, and a concave support member 104. The handle portion 102 may be substantially elongated with a hole 101 disposed in the lower end 108 to permit access to the internal area of the handle portion 102. In an example, the lower end 108 may comprise a substantially square or rectangular base, although other shapes are possible. The lower end 108 may integrally join with the upper end 106 in a tapered configuration such that the upper end 106 comprises a smaller thickness than the lower end 108. In other configurations, the lower end 108 and upper end 106 may comprise the same thickness. Furthermore, the lower end 108 and upper end 106 may comprise an integral unit without separation or gaps therebetween.

Figure 1B:
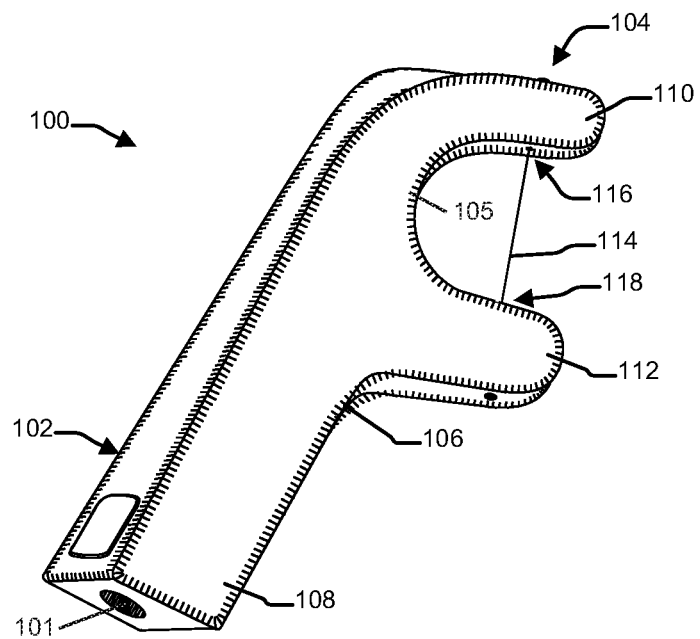
FIG. 1B is a side isometric view of the disposable flosser head attachment for a water floss pick, according to the embodiments herein.
Figure 1C:
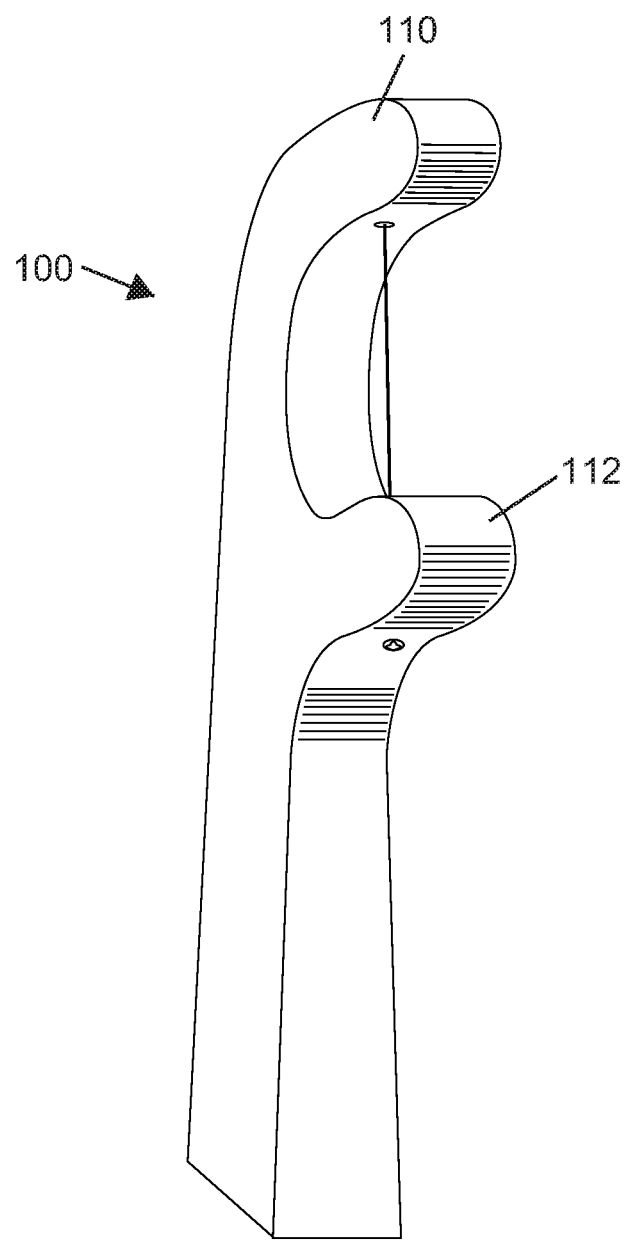
FIG. 1C is a front isometric view of another disposable flosser head attachment for a water floss pick, according to the embodiments herein.
Figure 2A:
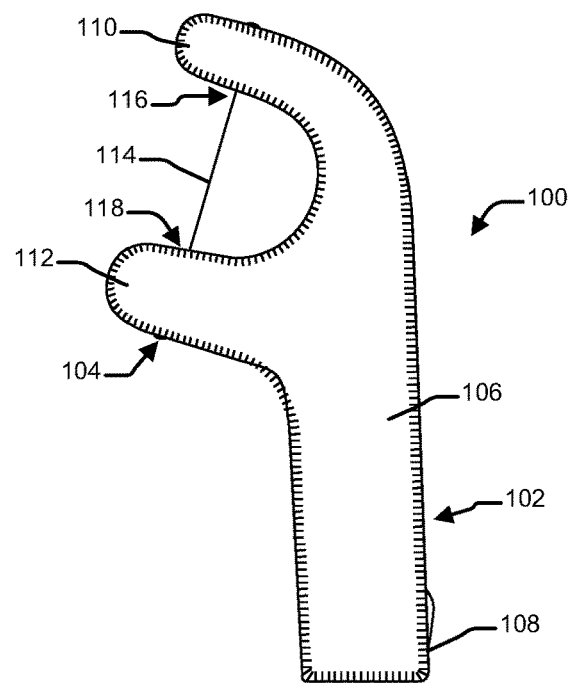
FIG. 2A is a side view of the disposable flosser head attachment for a water floss pick, according to the embodiments herein.
Figure 2B:
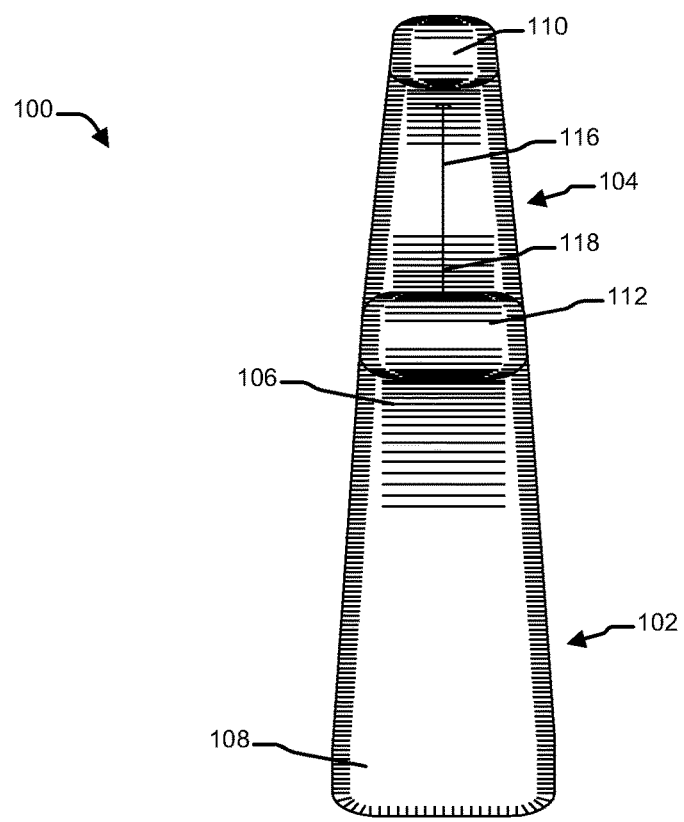
FIG. 2B is a front view of the disposable flosser head attachment for a water floss pick, according to the embodiments herein.
Figure 2C:
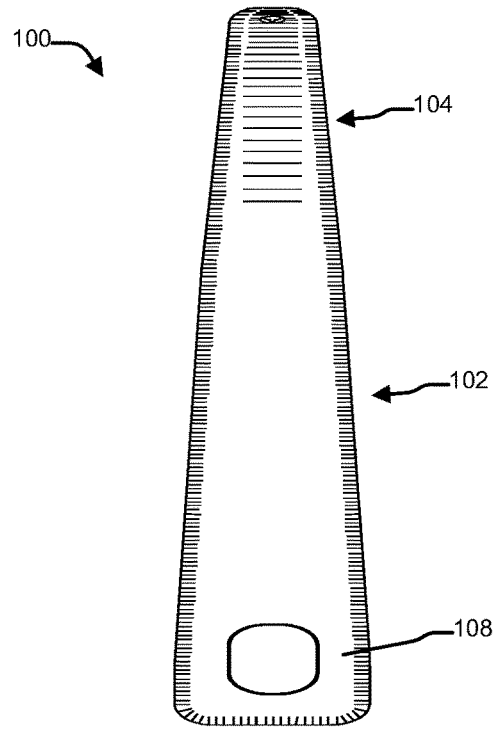
FIG. 2C is a back view of the disposable flosser head attachment for a water floss pick, according to the embodiments herein.
Figure 2D:
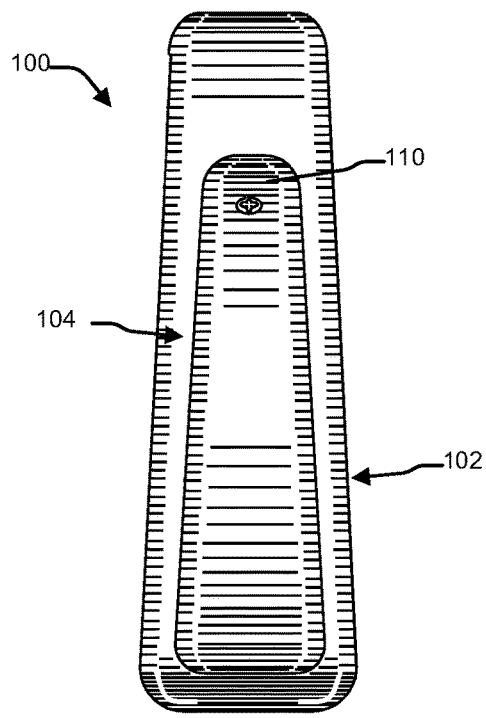
FIG. 2D is a top view of the disposable flosser head attachment for a water floss pick, according to the embodiments herein.
Figure 2E:
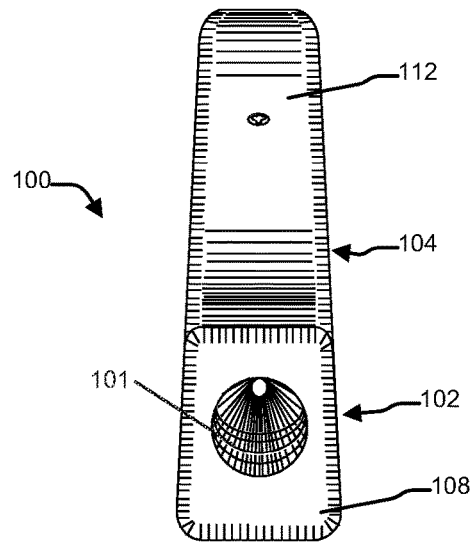
FIG. 2E is a bottom view of the disposable flosser head attachment for a water floss pick, according to the embodiments herein.

The concave support member 104 may be integrally coupled to the handle portion 102 at the upper end 106 of the handle portion 102 to make the handle portion 102 and the concave support member 104 an integral unit. The concave support member 104 can have a first end 110 and a second end 112 connected by a concave connecting section 105. A floss attachment 114 may be attached between the first end 110 and the second end 112 of the concave support member 104 respectively through a first end 116 and a second end 118 of the floss attachment 114, as shown in FIG. 1B. In one example, as shown in FIG. 1C, the first end 110 and second end 112 may be configured to be substantially parallel to one another and both may be positioned to be substantially transverse to the handle portion 102 (i.e., the lower end 108 and upper end 106 of the handle portion 102). In another example, as shown in FIG. 1A, the first end 110 and the second end 110 are not substantially parallel to one another such that the first end 110 is angled towards the second end 112. In an example, the first end 110 and second end 112 may be shorter in length than the handle portion 102 to allow the apparatus 100 to assume a compact size. Moreover, the first end 110 and second end 112 may comprise rounded edges/tips to permit the apparatus 100 to be used in a user's mouth without a sharp or jagged tip potentially causing injury to the user's mouth. In an example, the first end 110 may be smaller in thickness than the second end 112.

In an example, the floss attachment 114 may be disposable and replaced with a new floss attachment 114 after a predetermined number of uses, which may permit the rest of the apparatus 100 to be re-used. The floss attachment 114 may comprise any suitable type of floss including waxed or unwaxed floss and may be coated with teeth whitening agents, for example, to enhance the dental hygiene experience for the user. The floss attachment 114 may be affixed by the first end 110 and second end 112, or may be removably connected to the first end 110 and the second end 112. For example, contact components, which are further described below, may be used to attach the floss attachment 114 to the first end 110 and second end 112. The floss attachment 114 is positioned such that there is sufficient space between the floss attachment 114 and the concave connecting section 105 to permit sufficient space to conduct flossing/picking/cleaning in a user's mouth.

In another example, the apparatus 100 for dental hygiene described herein can be a disposable apparatus and can be discarded and replaced with a new similarly configured apparatus 100 for subsequent use to prevent its over-usage over an extended period of time. Thus, it solves the problem of ensuring hygiene due to accumulation and growth of bacteria from mouth of the user, or from other sources, on the head of the flossing device. A user can determine the number of times the apparatus 100 may be re-used prior to discarding/replacement.

In one example, the disposable flosser head attachment apparatus 100 for a water floss pick can be used alone, without the use of water. In another example, the disposable apparatus for dental hygiene apparatus 100 can also be used with water after the apparatus 100 has been coupled with a water flosser tip 208, which converts it to a water floss pick. Additionally, the apparatus 100 may be used with mouthwash or other type of antiseptic rinse in addition to, or as a substitute for, the water.

Figure 3A:
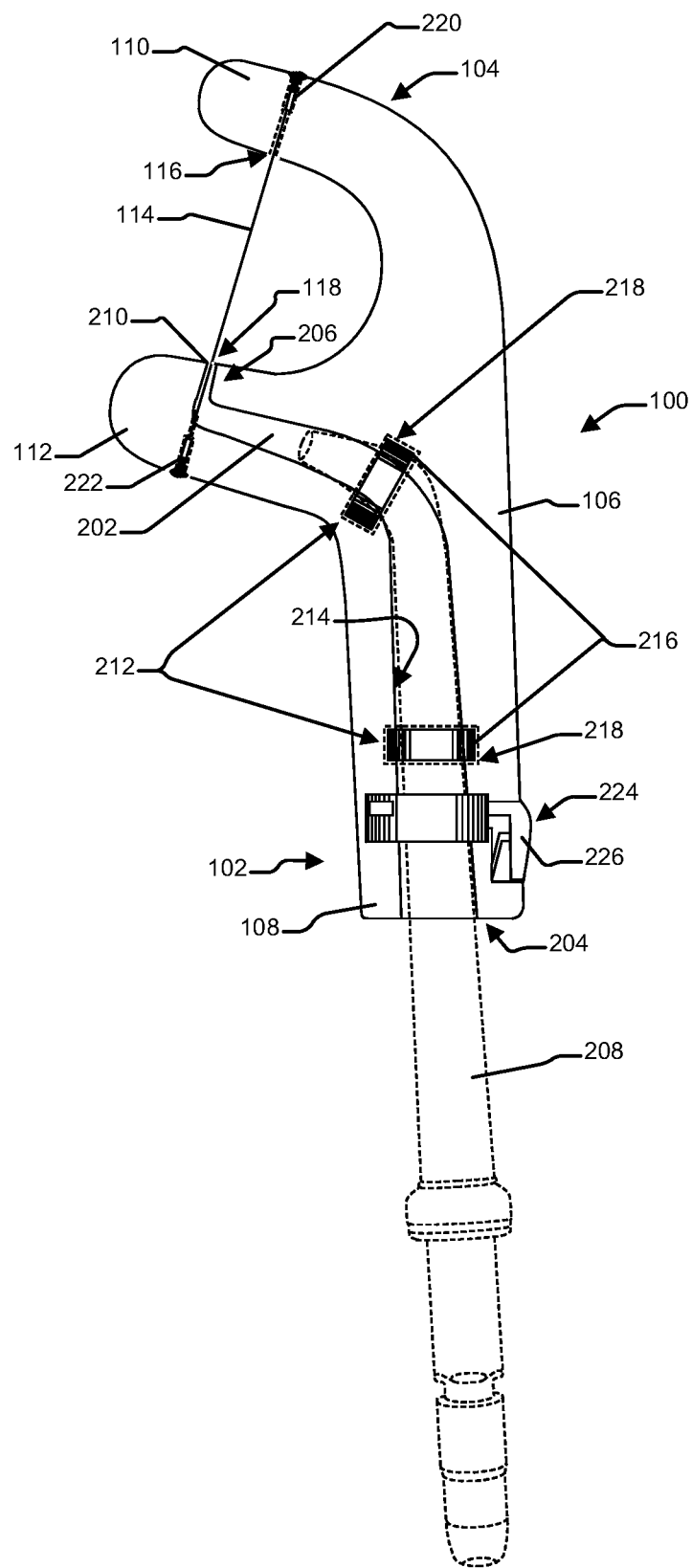
FIG. 3A is a side cutaway view of the disposable flosser head attachment for a water floss pick, according to the embodiments herein.
Figure 3B:
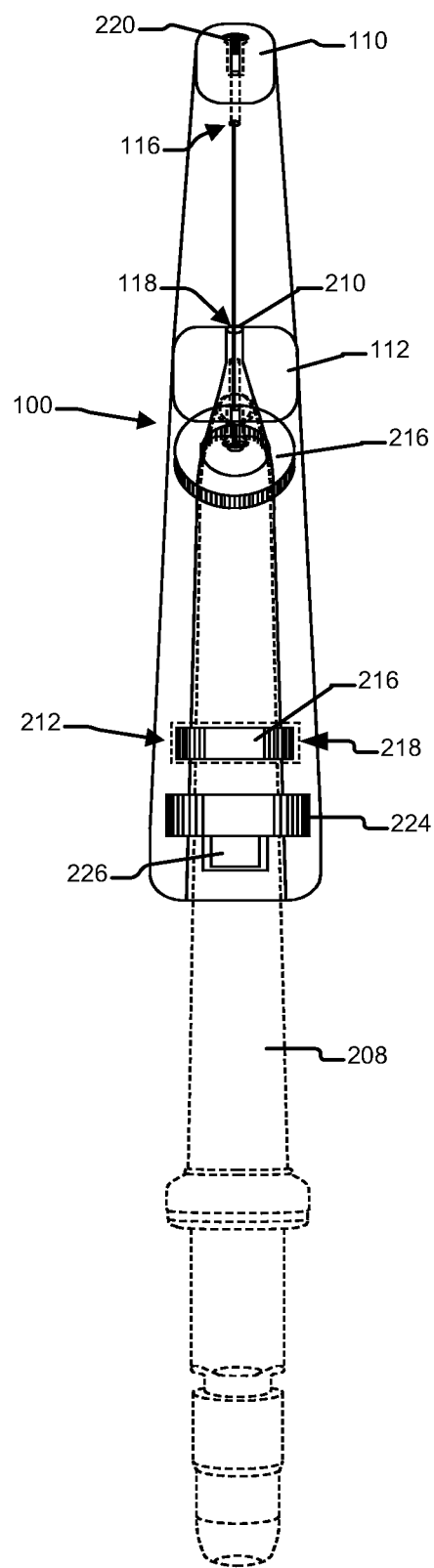
FIG. 3B is a front cutaway view of the disposable flosser head attachment for a water floss pick, according to the embodiments herein.

FIGS. 3A and 3B, with reference to FIGS. 1A through 2E, are side and front sectional views respectively of the apparatus 100, showing coupling of the apparatus 100 to a water flosser tip 208. To facilitate the coupling with a water flosser tip 208, the apparatus 100 may incorporate a hollow passage 202 extending from the hole 101 of the lower end 108 of the handle portion 102 to the second end 112 of the concave support member 104. The hollow passage 202 may be configured as a hole burrowed in the concave support member 104, in an example. Moreover, the hollow passage 202 may be configured as a tube, in another example. The hollow passage 202 may comprise a substantially elbow or "L" shaped configuration with an overall contour substantially aligning with the contour of the concave support member 104. In another example, the hollow passage 202 may be bent in any suitable configuration.

The hollow passage 202 may have a first end 204 located at the lower end 108 of the handle portion 102, and a second end 206 located at the second end 112 of the concave support member 104. The shape of the hollow passage 202 may follow the concave contour of the handle portion 102 and concave support member 104. The first end 204 of the hollow passage 202 can be configured to receive the water flosser tip 208. When the water flosser tip 208 is coupled with the apparatus 100, water from the water flosser tip 208 can flow towards the second end 206 of the hollow passage 202. The water flosser tip 208 may be any type of conventional water flosser tip used to discharge water.

The second end 206 of the hollow passage 202 can define an aperture 210, and the water from the water flosser tip 208 that flows through the hollow passage 202 exits the aperture 210. The aperture 210 can be concentric to the floss attachment 114 so that water exiting from the aperture 210 is directed in a direction from the second end 118 of the floss attachment 114 towards the first end 116, substantially parallel to the floss attachment 114.

To prevent the flow of water from the water flosser tip 208 towards the first end 204 of the hollow passage 202, at least one sealing mechanism 212 can be provided on an inner surface 214 of the hollow passage 202 such that the sealing mechanism 212 is configured to engage with the water flosser tip 208 to seal any gap therebetween.

In an example, the sealing mechanism 212 may be configured as O-rings 216 or other similar components located in grooves 218 provided on the inner surface 214 of the hollow passage 202 such that when the water flosser tip 208 is received in the hollow passage 202, the O-rings 216 engage with the water flosser tip 208 to seal any gap therebetween.

The apparatus 100 may further comprise a lock mechanism 224 located adjacent to the lower end 108 of the handle portion 102. The lock mechanism 224 can be configured to selectively retain and release the water flosser tip 208 received in the hollow passage 202. The lock mechanism 224 may be configured as any suitable type of locking device including latching mechanisms, mechanical mechanisms, electrical mechanisms, magnetic mechanisms, or combinations thereof. A push button 226 of the lock mechanism 224 can be provided on an outer surface of the handle portion 102 to unlock the water flosser tip 208 so that the water flosser tip 208 may be removed from the hollow passage 202 upon engaging the push button 226. The lock mechanism 224 may be configured to automatically lock the water flosser tip 208 in position when inserted in the hollow passage 202 to a designated position.

Also shown in FIGS. 3A and 3B are details of fixing the floss attachment 114 with the concave support member 104. There is a first contact component 220 to support the first end 116 of the floss attachment 114 with the first end 110 of the concave support member 104, and a second contact component 222 to support the second end 118 of the floss attachment 114 with the second end 112 of the concave support member 104. The handle portion 102 and the concave support member 104 can be made of a polymeric material, such as a silicone based polymeric material, which may allow for an easy grip of the handle portion 102 and concave support member 104 even when wet, and may also permit ease of cleaning (e.g., wiping, washing, etc.). Furthermore, the concave support member 104 may also comprise a polymeric material. Additionally, in an example, the concave support member 104 may comprise a resilient material that permits flexing and bending of the concave support member 104, which may permit further ease and safety of use in a user's mouth as the concave support member 104 may press against the user's teeth, gums, and/or tongue.

Figure 4:
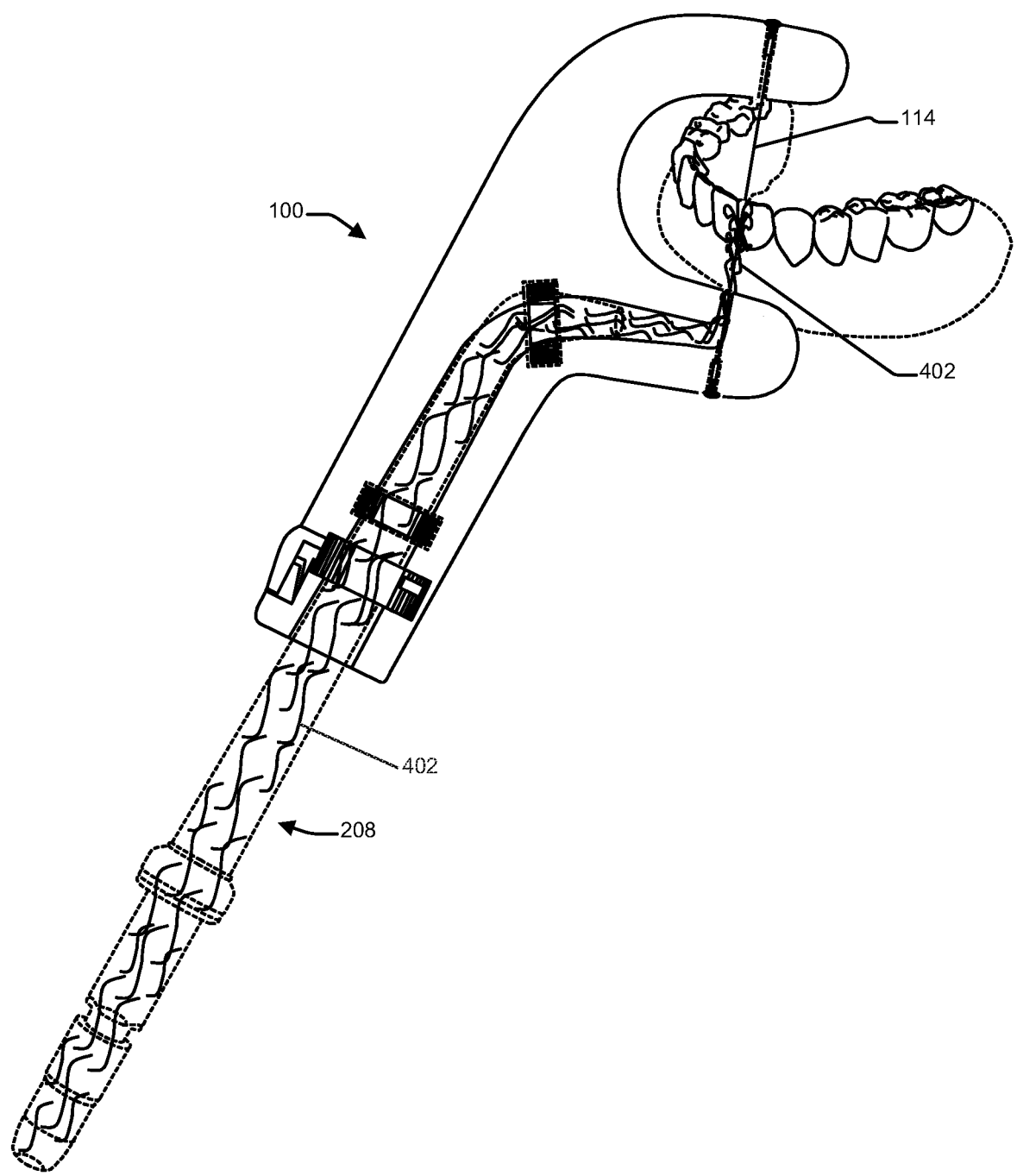
FIG. 4 shows the disposable flosser head attachment for a water floss pick being used for performing dental hygiene, according to the embodiments herein.

FIG. 4, with reference to FIGS. 1A through 3B, illustrates the disposable flosser head attachment apparatus 100 being used for performing dental hygiene. As shown, the water flosser tip 208 is coupled with the disposable flosser head attachment apparatus 100, and water 402 flows along the floss attachment 114 for the flosser head attachment apparatus 100 to work as a water floss pick. Coupling of the apparatus 100 with a water flosser tip 208 can be performed when the apparatus 100 is to be used as a water floss pick, for example. The coupling allows water from the water flosser tip 208 to work together with the floss attachment 114 for flossing action. Alternatively, the apparatus 100 can also be used for performing dental hygiene in standalone manner, without being coupled with the water flosser tip 208. Further, the apparatus 100 may be disposable, and can be replaced to prevent its over-usage over an extended period of time. Thus, it solves the problem of ensuring hygiene due to accumulation and growth of bacteria from mouth of the user, or from other sources, on the head of the flossing device.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An apparatus for performing dental hygiene comprising:
   a handle portion having an upper end and a lower end;
   a concave support member integrally coupled to the handle portion at the upper end of the handle portion; the concave support member comprising a first end and a second end;
   a floss attachment comprising a first end and a second end, wherein the first end of the floss attachment is connected to the first end of the concave support member, and the second end of the floss attachment is connected to the second end of the concave support member; and
   a hollow passage extending from the lower end of the handle portion to the second end of the concave support member, wherein the hollow passage having a first end located at the lower end of the handle portion and a second end located at the second end of the concave support, wherein the first end of the hollow passage is configured to receive a substantially curved water flosser tip such that water from the water flosser tip traverses towards the second end of the hollow passage, wherein a contour configuration of the hollow passage substantially matches a contour configuration of the water flosser tip;

a lock mechanism located adjacent to the lower end of the handle portion, the lock mechanism being configured to selectively retain and release the water flosser tip received in the hollow passage; and at least one sealing mechanism comprising a pair of O-rings located in a pair of grooves individually provided on an inner surface of the hollow passage, the at least one sealing mechanism configured to engage with the water flosser tip received in the hollow passage to seal gaps therebetween and to prevent flow of water from the water flosser tip towards the first end of the hollow passage, wherein a first O-ring of the pair of O-rings is positioned around a substantially straight portion of the water flosser tip and the hollow passage and substantially adjacent to the lock mechanism, wherein a second O-ring of the pair of O-rings is positioned around a substantially curved portion of the water flosser tip and the hollow passage and substantially adjacent to an opening of the water flosser tip, wherein the lock mechanism comprises a push button located on an outer surface of the handle portion to unlock the water flosser tip to remove the water flosser tip from the hollow passage upon engaging the push button, wherein the lock mechanism is to automatically lock the water flosser tip in position when inserted in the hollow passage to a designated position, wherein the second end of the hollow passage defines an aperture positioned to direct water traversing the hollow passage onto the floss attachment in a direction from the second end of the floss attachment towards the first end of the floss attachment substantially parallel to the floss attachment, wherein the second end of the concave support member is positioned to be substantially transverse to the handle portion, wherein the hollow passage includes an elbow such that the hollow passage extends from the lower end of the handle portion to the second end of the concave support member, and wherein the aperture is concentric to the floss attachment.

2. The apparatus of claim 1, comprising a first contact component to support the floss attachment at the first end of the floss attachment, and a second contact component to support the floss attachment at the second end of the floss attachment.

3. The apparatus of claim 1, wherein the handle portion and the concave support member comprise a polymeric material.

4. An apparatus for performing dental hygiene comprising:

a handle portion having an upper end and a lower end;

a concave support member integrally coupled to the handle portion at the upper end of the handle portion; the concave support member comprising a first end and a second end;

a floss attachment comprising a first end and a second end, wherein the first end of the floss attachment is connected to the first end of the concave support member, and the second end of the floss attachment is connected to the second end of the concave support member;

a hollow passage extending from the lower end of the handle portion to the second end of the concave support member, wherein the hollow passage having a first end located at the lower end of the handle portion and a second end located at the second end of the concave support, wherein the first end of the hollow passage is configured to receive a substantially curved water flosser tip such that water from the water flosser tip traverses towards the second end of the hollow passage;

at least one sealing mechanism located on an inner surface of the hollow passage, the at least one sealing mechanism configured to engage with the water flosser tip received in the hollow passage to prevent flow of water from the water flosser tip towards the first end of the hollow passage;

a lock mechanism located adjacent to the lower end of the handle portion, the lock mechanism being configured to selectively retain and release the water flosser tip received in the hollow passage, wherein the lock mechanism comprises a push button located on an outer surface of the handle portion to unlock the water flosser tip to remove the water flosser tip from the hollow passage;

wherein the at least one sealing mechanism comprises a pair of O-rings located in a pair of grooves individually provided on the inner surface of the hollow passage such that, when the water flosser tip is received in the hollow passage, the pair of O-rings engage with the water flosser tip to provide sealing to prevent flow of water from the water flosser tip towards the first end of the hollow passage, wherein a first O-ring of the pair of O-rings is positioned around a substantially straight portion of the water flosser tip and the hollow passage and substantially adjacent to the lock mechanism, wherein a second O-ring of the pair of O-rings is positioned around a substantially curved portion of the water flosser tip and the hollow passage and substantially adjacent to an opening of the water flosser tip, wherein the second end of the hollow passage defines an aperture positioned to direct water traversing the hollow passage onto the floss attachment in a direction from the second end of the floss attachment towards the first end of the floss attachment substantially parallel to the floss attachment, and wherein the aperture is concentric to the floss attachment.

5. The apparatus of claim 4, wherein the handle portion and the concave support member comprise a polymeric material.

6. An apparatus for performing dental hygiene comprising:

a handle portion having an upper end and a lower end;

a concave support member integrally coupled to the handle portion at the upper end of the handle portion; the concave support member comprising a first end and a second end;

a floss attachment comprising a first end and a second end, wherein the first end of the floss attachment is connected to the first end of the concave support member, and the second end of the floss attachment is connected to the second end of the concave support member;

a hollow passage extending from the lower end of the handle portion to the second end of the concave support member, wherein the hollow passage having a first end located at the lower end of the handle portion and a second end located at the second end of the concave support;

at least one sealing mechanism located on an inner surface of the hollow passage, the at least one sealing mechanism configured to engage with the water flosser tip received in the hollow passage to prevent flow of water from the water flosser tip towards the first end of the hollow passage; and a lock mechanism located adjacent to the lower end of the handle portion, the lock mechanism being configured to selectively retain and release the water flosser tip received in the hollow passage, wherein the first end of the hollow passage is configured to receive a water flosser tip such that water from the water flosser tip traverses towards the second end of the hollow passage, wherein a contour configuration of the hollow passage substantially matches a contour configuration of the water flosser tip, wherein the lock mechanism comprises a push button located on the handle portion to unlock the water flosser tip to remove the water flosser tip from the hollow passage, wherein the at least one sealing mechanism comprises a pair of O-rings located in a pair of grooves individually provided on the inner surface of the hollow passage such that, when the water flosser tip is received in the hollow passage, the pair of O-rings engage with the water flosser tip to provide sealing to prevent flow of water from the water flosser tip towards the first end of the hollow passage, wherein a first O-ring of the pair of O-rings is positioned around a substantially straight portion of the water flosser tip and the hollow passage and substantially adjacent to the lock mechanism, and wherein a second O-ring of the pair of O-rings is positioned around a substantially curved portion of the water flosser tip and the hollow passage and substantially adjacent to an opening of the water flosser tip.

7. The apparatus of claim 6, comprising a first contact component to support the floss attachment at the first end of the floss attachment, and a second contact component to support the floss attachment at the second end of the floss attachment, wherein the second end of the hollow passage defines an aperture positioned to direct water traversing the hollow passage onto the floss attachment in a direction from the second end of the floss attachment towards the first end of the floss attachment substantially parallel to the floss attachment, and wherein the aperture is concentric to the floss attachment, and wherein the handle portion and the concave support member comprise a polymeric material.

8. The apparatus of claim 4, comprising a first contact component to support the floss attachment at the first end of the floss attachment, and a second contact component to support the floss attachment at the second end of the floss attachment.

9. The apparatus of claim 4, wherein the second end of the concave support member is positioned to be substantially transverse to the handle portion, and wherein the hollow passage includes an elbow such that the hollow passage extends from the lower end of the handle portion to the second end of the concave support member.

10. The apparatus of claim 6, wherein the second end of the concave support member is positioned to be substantially transverse to the handle portion, and wherein the hollow passage includes an elbow such that the hollow passage extends from the lower end of the handle portion to the second end of the concave support member.

* * * * *